(12) United States Patent
Kaneko et al.

(10) Patent No.: US 8,934,241 B2
(45) Date of Patent: Jan. 13, 2015

(54) ELECTRONIC DEVICE WITH COOLING CAPABILITY

(75) Inventors: Haruka Kaneko, Kyoto (JP); Shintaro Tanaka, Osaka (JP); Shinji Goto, Osaka (JP)

(73) Assignee: Panasonic Corporation, Osaka (JP)

( * ) Notice: Subject to any disclaimer, the term of this patent is extended or adjusted under 35 U.S.C. 154(b) by 281 days.

(21) Appl. No.: 13/176,418

(22) Filed: Jul. 5, 2011

(65) Prior Publication Data

US 2012/0069520 A1   Mar. 22, 2012

(30) Foreign Application Priority Data

Sep. 22, 2010   (JP) ................................. 2010-212511

(51) Int. Cl.
*H05K 7/20* (2006.01)
*G06F 1/20* (2006.01)

(52) U.S. Cl.
CPC ..................................... *G06F 1/203* (2013.01)
USPC .. 361/695; 361/690; 361/679.48; 361/679.49

(58) Field of Classification Search
USPC .......................... 361/690–695, 679.48–679.51
See application file for complete search history.

(56) References Cited

U.S. PATENT DOCUMENTS

| | | | | |
|---|---|---|---|---|
| 5,218,514 A * | 6/1993 | Huynh et al. | ............ | 361/679.47 |
| 5,793,608 A * | 8/1998 | Winick et al. | ................. | 361/695 |
| 5,927,386 A * | 7/1999 | Lin | ............................... | 165/80.3 |
| 6,396,684 B2 * | 5/2002 | Lee | ........................... | 361/679.49 |
| 6,515,856 B2 * | 2/2003 | Hidesawa | ................. | 361/679.48 |
| 6,840,629 B2 | 1/2005 | Suzuki et al. | | |
| 6,980,432 B2 * | 12/2005 | Natsume et al. | .............. | 361/690 |
| 2001/0043463 A1 * | 11/2001 | Lee | ................. | 361/724 |
| 2002/0008961 A1 * | 1/2002 | Amaike et al. | ................. | 361/687 |
| 2002/0027772 A1 * | 3/2002 | Katsui et al. | .................. | 361/690 |
| 2002/0053421 A1 | 5/2002 | Hisano et al. | | |
| 2002/0054478 A1 * | 5/2002 | Hidesawa | ...................... | 361/687 |
| 2002/0075647 A1 * | 6/2002 | DiFonzo et al. | ............. | 361/687 |
| 2002/0080334 A1 | 6/2002 | Suzuki et al. | | |
| 2004/0066631 A1 | 4/2004 | Natsume et al. | | |
| 2004/0264145 A1 * | 12/2004 | Miller et al. | .................. | 361/725 |
| 2005/0046802 A1 | 3/2005 | Suzuki et al. | | |
| 2006/0120037 A1 * | 6/2006 | DeLuga et al. | ............... | 361/690 |
| 2006/0198105 A1 * | 9/2006 | Wyatt et al. | .................. | 361/697 |
| 2008/0019093 A1 | 1/2008 | Hongo | | |
| 2008/0151492 A1 * | 6/2008 | Maddox | ........................ | 361/687 |
| 2009/0103265 A1 | 4/2009 | Hongo | | |

FOREIGN PATENT DOCUMENTS

| | | |
|---|---|---|
| JP | 11-087961 | 3/1999 |
| JP | 2000-250658 | 9/2000 |
| JP | 2001-056741 | 2/2001 |
| JP | 2002-151875 | 5/2002 |

(Continued)

*Primary Examiner* — Anatoly Vortman
(74) *Attorney, Agent, or Firm* — Hamre, Schumann, Mueller & Larson, P.C.

(57) ABSTRACT

In the electronic device, an inlet 10 is provided on a front face 1c of a first housing 1. Thus, it is possible to reduce the possibility of the inlet 10 being blocked by objects. That is, when a user uses a notebook computer in a normal position, his body opposes the front face 1c in many cases. Thus, when the inlet is provided on the front face 1c, the inlet is less likely to be blocked than when it is provided on any other face of the first housing 1. For this reason, the cooling efficiency within the first housing 1 does not drop.

3 Claims, 11 Drawing Sheets

(56) References Cited

FOREIGN PATENT DOCUMENTS

| JP | 2003-031981 | 1/2003 |
| JP | 3815559 | 6/2006 |
| JP | 2007-324339 | 12/2007 |
| JP | 2008-10769 | 1/2008 |

* cited by examiner

US 8,934,241 B2

ELECTRONIC DEVICE WITH COOLING CAPABILITY

BACKGROUND OF INVENTION

1. Field of the Invention

The present application relates to an electronic device with a cooling capability.

2. Description of Related Art

With the increase in the number of functions of electronic devices such as notebook computers in recent years, the processing speed of the electronic components constituting the internal signal processing circuits has increased. Generally, the electronic components produce heat during operation. Thus, the amount of heat produced by the electronic components increases as the processing speed increases. That is, for electronic devices, an improvement in the cooling efficiency within the devices is a problem that needs to be tackled as the number of the functions increases.

JP 2003-031981 discloses a cooling structure where air is introduced into a housing through one side of the housing to which a fan is fixed and is let out from the other side of the housing.

However, as disclosed in JP 2003-031981, with the structure where the inlet and the outlet are provided on the sides of the housing, there is a possibility of the inlet or the outlet being blocked with objects, which may lead to a drop in the cooling efficiency of the device. For example, in the case of a notebook computer, when books or the like are placed on a position where the inlet could be blocked by them, a flow of outside air into the device through the inlet is blocked by the books, which may lead to a drop in the cooling efficiency of the notebook computer.

SUMMARY OF THE INVENTION

The electronic device disclosed in the present application is an electronic device provided with a heat-producing component. The electronic device includes: a housing for containing the heat-producing component; an inlet provided to the housing, the inlet permitting communication between the inside and the outside of the housing; an outlet provided to the housing, the outlet permitting communication between the inside and the outside of the housing; and an air blower for allowing air in the housing to flow toward the outlet. The inlet is provided to the housing on a side a user faces when operating the electronic device.

DETAILED DESCRIPTION OF THE EMBODIMENTS

Embodiment 1

[1. Configuration of Electronic Device]

Figure 1:
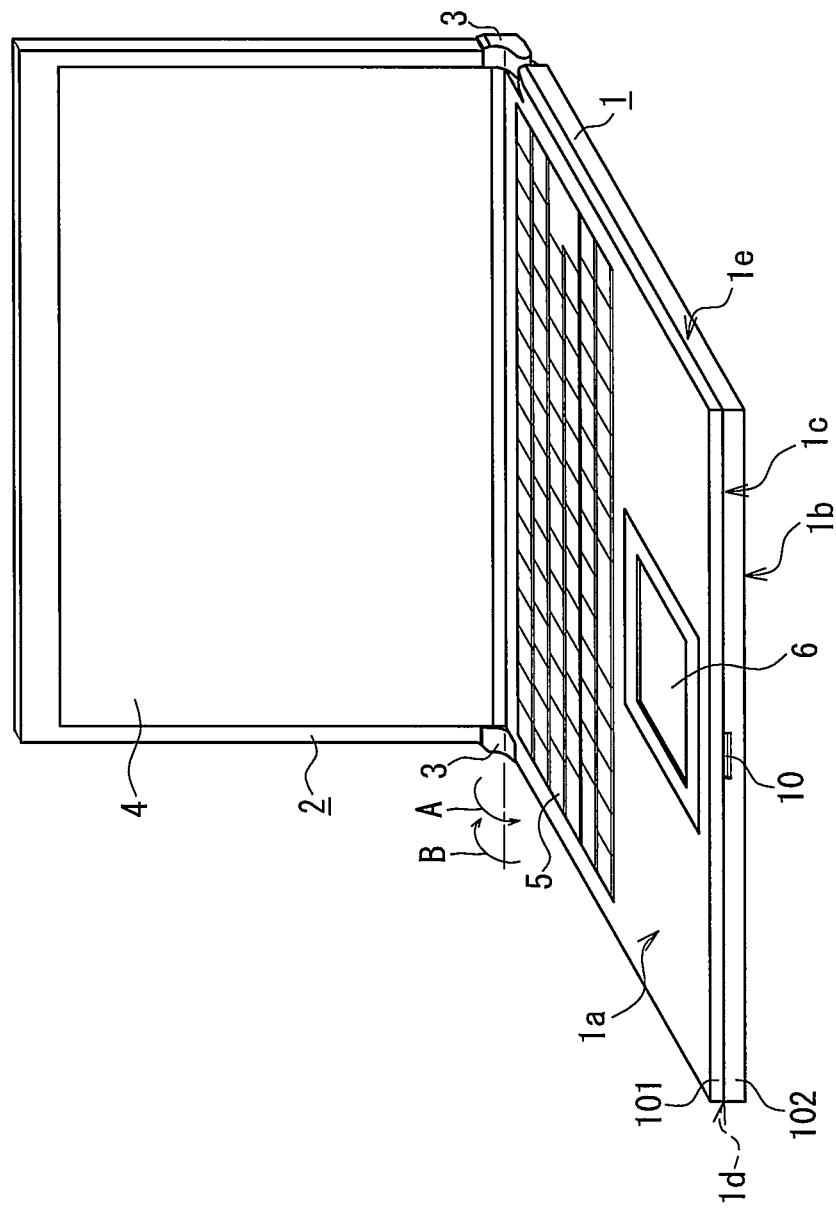
FIG. 1 is a perspective view of a notebook computer according to one embodiment.

FIG. 1 is an external perspective view of a notebook computer according to the present embodiment. Although the notebook computer will be described in the present embodiment as one example of the electronic device, this is just an example of the electronic device. Thus, the electronic device according to the present embodiment can be any electronic device as long as it includes at least a heat-producing component and a cooling mechanism.

As shown in FIG. 1, the notebook computer includes a first housing 1 and a second housing 2. The first housing 1 includes a circuit board on which a variety of electronic elements are mounted, a hard disk drive and the like. The first housing 1 is composed of two cases; a top case 101 and a bottom case 102. The top case 101 primarily forms a top face 1a of the first housing 1, and a bottom case 102 primarily forms a bottom face 1b of the first housing 1. The top case 101 and the bottom case 102 are coupled to each other and form an internal space in which a CPU and the like can be disposed. Although the top case 101 and the bottom case 102 are coupled to each other by screws in the present embodiment, they may be coupled to each other with an adhesive or by hook engagement. An inlet 10 is provided on a front face 1c of the first housing 1.

The second housing 2 includes a liquid crystal display 4. The first housing 1 and the second housing 2 are each supported by hinge portions 3 rotatably. The hinge portions 3 include spindles for supporting the first housing 1 and the second housing 2 rotatably in the directions of the arrows A and B.

Figure 2:
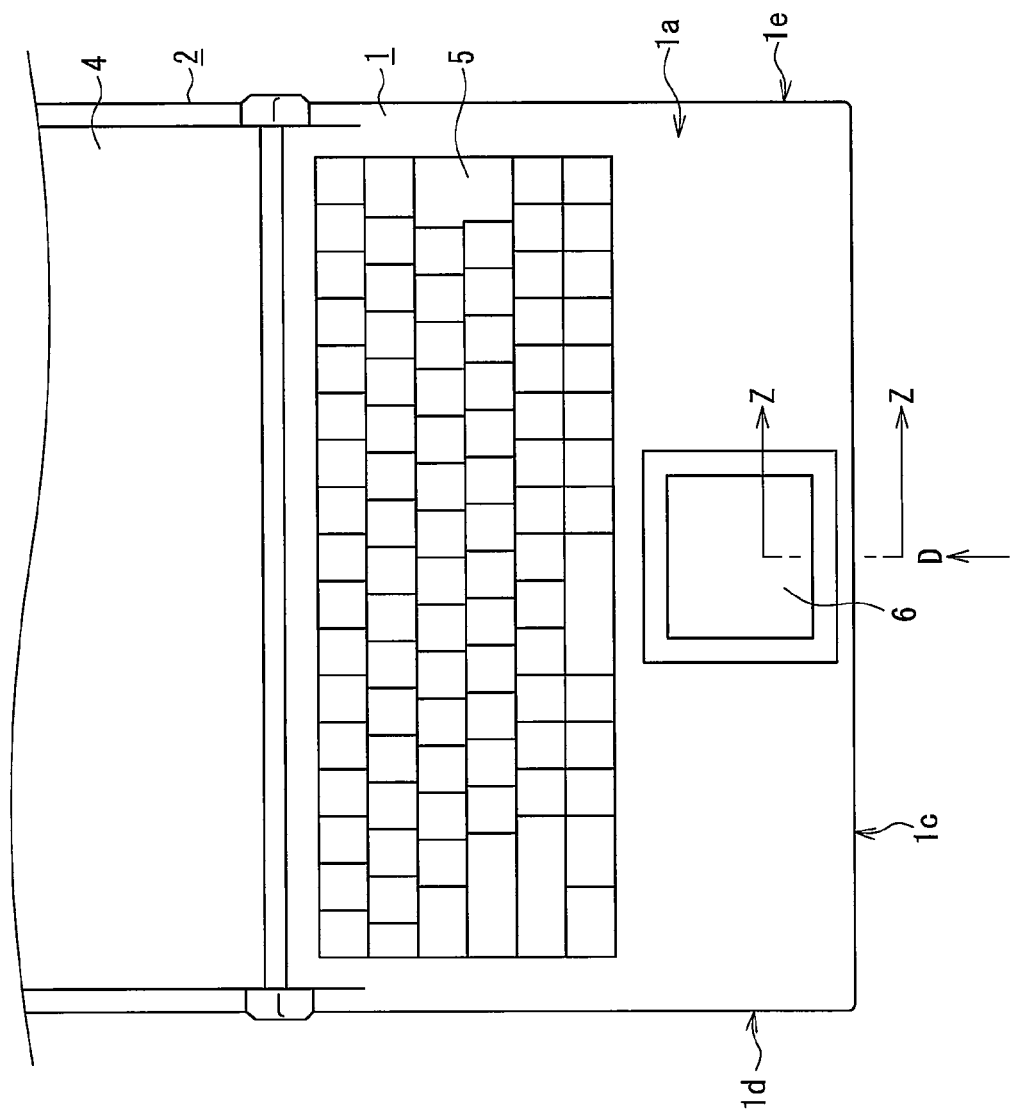
FIG. 2 is a plan view of a first housing.

FIG. 2 is a plan view of the first housing of the notebook computer. As shown in FIGS. 1 and 2, a keyboard 5 and a pointing device 6 are placed on the top face 1a of the first housing 1. The bottom face 1b of the first housing 1 is the backside of the top face 1a. Of the side faces of the first housing 1 adjacent to the top face 1a and the bottom face 1b, the front face 1c is the one most distant from the hinge portions 3. When a user looks at what is displayed on the liquid crystal display 4 and manipulates the keyboard 5, the front face 1c faces the user. The inlet 10 is provided on the front face 1c.

Figure 3:
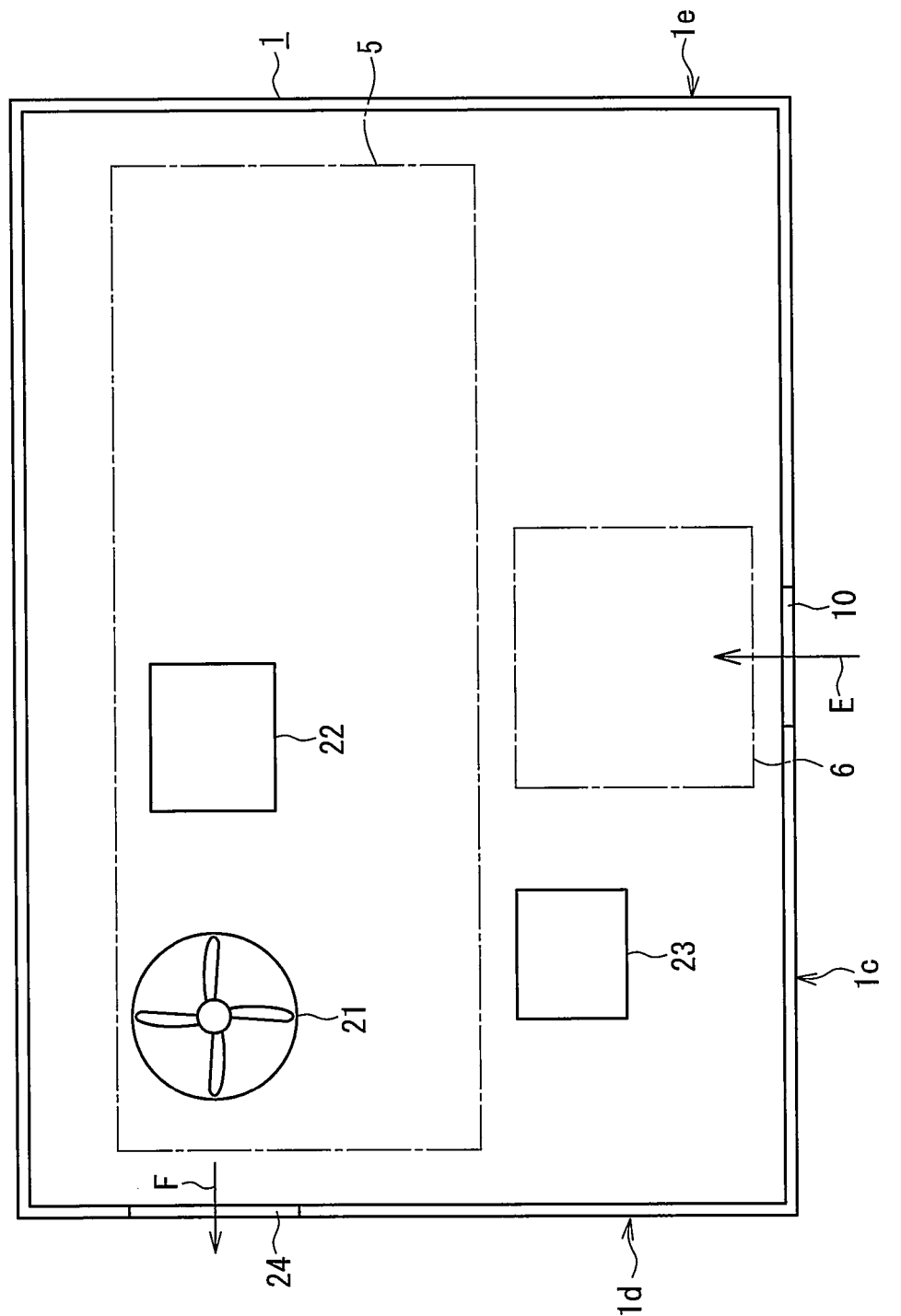
FIG. 3 is a plan view showing the internal configuration of the first housing.

FIG. 3 is a plan view showing the internal structure of the first housing 1. FIG. 3 shows the first housing 1 shown in FIG. 2 with the top case forming the top face 1a of the first housing 1, the keyboard 5, the pointing device 6 and the like being removed. As shown in FIG. 3, the first housing 1 includes a fan 21, a central processing unit (CPU) 22, and a random-access memory (RAM) 23. In reality, the first housing 1 of the notebook computer includes a hard disk drive and a variety of electronic components in addition to the components shown in FIG. 3, but the drawing only shows the principal components to illustrate the internal structure of the first housing 1 clearly. An outlet 24 is provided on the left side face 1d of the first housing 1.

The fan 21 includes a plurality of blades and a motor. When power is supplied to the motor, the fan rotates at high speed and generates a flow of air within the first housing 1. The fan 21 is disposed in the vicinity of the outlet 24. The CPU 22 executes a variety of types of information processing. The CPU 22 is disposed in the vicinity of the fan 21. In the RAM 23, data and programs are stored temporarily when the CPU 22 executes information processing. The RAM 23 is disposed in the vicinity of the outlet 10. Note that the locations of the fan 21, the CPU 22, and the RAM 23 shown in FIG. 3 are one example. Further, the location of the outlet 24 shown in FIG. 3 is one example, and the outlet 24 may be provided on the right side face 1e.

In the first housing 1 shown in FIG. 3, when the fan 21 is brought into operation, outside air is introduced into the first housing 1 through the inlet 10 as indicated by the arrow E. The air introduced into the first housing 1 takes away heat produced by the CPU 22, the RAM 23 and the like and is let out through the outlet 24 as indicated by the arrow F.

Figure 4:
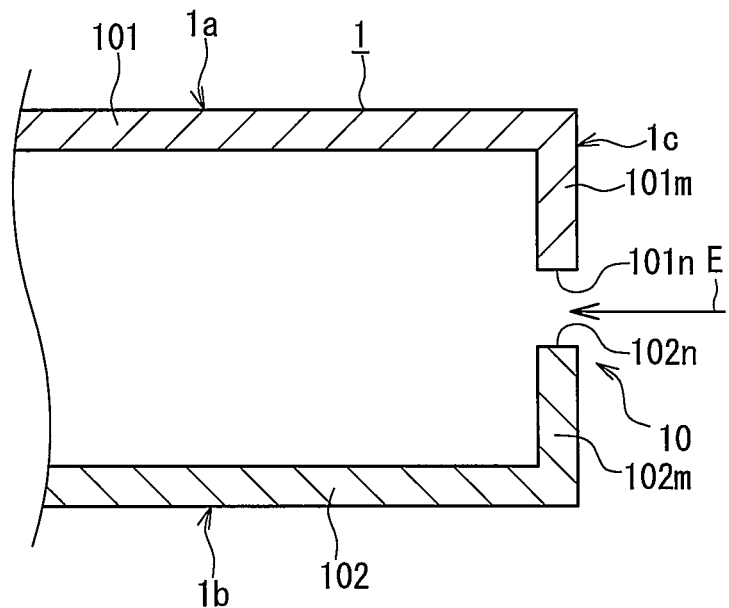
FIG. 4 is a cross-sectional view of a Z-Z portion in FIG. 2.

FIG. 4 is a cross-sectional view of the Z-Z portion in FIG. 2. As shown in FIG. 4, the inlet 10 is provided on the front face 1c of the first housing 1. The inlet 10 is provided at the center in the thickness direction of the first housing 1. The location of the inlet 10 is not limited to the center in the thickness direction of the first housing 1, and the inlet 10 may be provided on the front face 1c at a location close to the top face 1a or at a location close to the bottom face 1b. The inlet 10 is formed by causing a recess 101n formed in a wall 101m of the top case 101 and a recess 102n formed in a wall 102m of the bottom case 102 to oppose each other. Note that the inlet 10 can be defined by the recess 101n formed in the top case 101 or the recess 102n formed in the bottom case 102 alone.

When the fan 21 (see FIG. 3) operates in the notebook computer configured as above, outside air flows into the first housing 1 through the inlet 10 as indicated by the arrow E.

[2. Effects of Embodiment, etc.]

With the present embodiment, the possibility of the inlet 10 being blocked by objects can be reduced because the inlet 10 is provided on the front face 1c of the first housing 1. That is, it is quite likely that the user faces the front face 1c in most of the cases when he operates the notebook computer in a normal position. Thus, when the inlet 10 is provided on the front face 1c, the inlet 10 is less likely to be blocked than when it is provided on any other face of the first housing 1, so that the cooling efficiency in the first housing 1 is less likely to drop.

Further, because the inlet 10, the RAM 23, and the outlet 24 generally are aligned in this order in the present embodiment, it is possible to improve the efficiency of cooling the RAM 23. If the inlet 10 is not provided on the front face 1c of the first housing 1 but on the right side face 1e of the first housing 1 at a portion opposing the outlet 24, it is difficult for air introduced into the housing through the inlet to flow toward the RAM 23, so that the efficiency of cooling the RAM 23 is hard to improve. Note that the electronic component to be aligned with the inlet 10 and the outlet 24 is not limited to the RAM 23 and any other electronic component, such as the CPU, may be so used.

Embodiment 2

[1. Configuration of Electronic Device]

In a notebook computer according to Embodiment 2, the inlet 10 is configured differently from that in Embodiment 1. Hereinafter, the configuration of the inlet 10 of the notebook computer according to Embodiment 2 will be mainly described.

Figure 5:
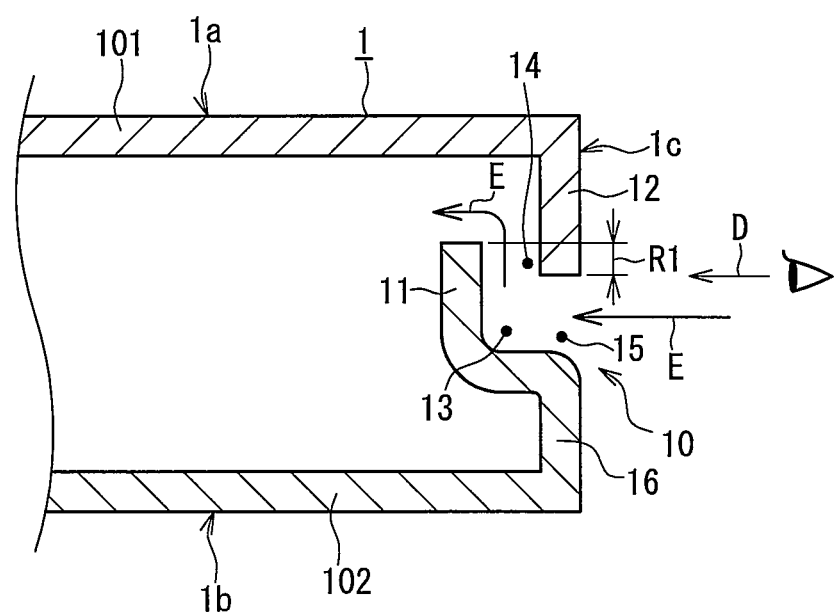
FIG. 5 is a cross-sectional view of the Z-Z portion in FIG. 2.

FIG. 5 is a cross-sectional view of the Z-Z portion in FIG. 2. As shown in FIG. 5, the inlet 10 is formed by recessing a part of the front face 1c of the first housing 10 toward the inside of the first housing 1 and forming a flow space 13. The first wall 11 and the second wall 12 form the flow space 13, thereby forming the inlet 10. The first wall 11 is situated inwardly from the front face 1c of the first housing 1 and is inside the first housing 1. The second wall 12 constitutes the front face 1c of the first housing 1. The first wall 11 and the second wall 12 overlap one another in the thickness direction of the first housing 1. R1 is a dimension by which the first wall 11 and the second wall 12 overlap one another. R1 as the overlapping amount is not particularly limited as long as it at least is sufficient to hide the inside of the first housing 1 from the user's sight when the user looks at the inlet in the direction of the arrow D, and is preferably 1 mm or more. When the fan 21 (see FIG. 3) operates, outside air passes through the flow space 13 as indicated by the arrow E and flows into the first housing 1 in the inlet 10 shown in FIG. 5.

In FIG. 5, a first gap 14 is a gap between the first wall 11 and the second wall 12, and a second gap 15 is a gap between the second wall 12 and a third wall 16. In the inlet 10 according to the present embodiment, the first gap 14 is situated close to the top face 1a of the first housing 1 then the second gap 15. As a result of having such a configuration, the pass of outside air can be bent toward the top face 1a as indicated by the arrow E. Thus, even if foreign matters such as dust are contained in outside air, since it is difficult for the foreign matters to pass through the first wall 11 due to their own weight, the foreign matters are less likely to enter the first housing 1.

Figure 6:
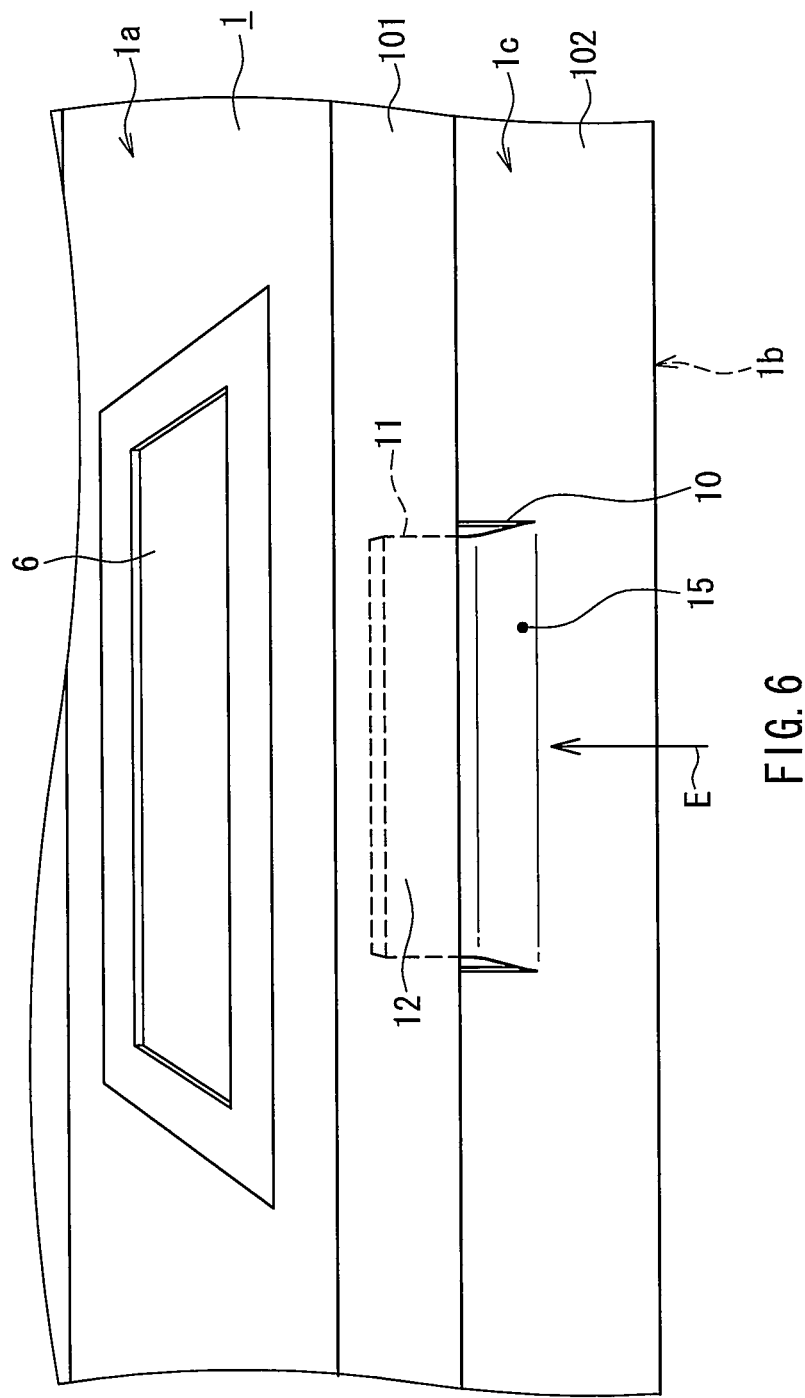
FIG. 6 is a perspective view of principal portions of the first housing.

FIG. 6 is a perspective view of principal portions of the first housing 1 in the vicinity of the inlet 10. FIG. 6 is a view of the inlet 10 in the direction of the arrow D in FIG. 2. As shown in FIG. 6, the first wall 11 and the second wall 12 overlap one another at the inlet 10. Thus, when the first housing 1 is seen in the direction of the arrow D (see FIGS. 2 and 5), it is difficult to see the inside of the first housing 1. Consequently, it is possible to make the presence of the inlet 10 on the front face 1c of the first housing 1 less noticeable. If the first wall 11 and the second wall 12 do not overlap one another, it would be highly likely that components and the like included in the first housing 1 come within the user's sight through the gap between the first wall 11 and the second wall 12. For this reason, the presence of the inlet 10 becomes noticeable.

[2. Effects of Embodiment, etc.]

With the present embodiment, the possibility of the inlet 10 being blocked by objects can be reduced because the inlet 10 is provided on the front face 1c of the first housing 1. That is, it is quite likely that the user faces the front face 1c in most of the cases when he operates the notebook computer in a normal position. Thus, when the inlet 10 is provided on the front face 1c, the inlet 10 is less likely to be blocked than when it is provided on any other face of the first housing 1, so that the cooling efficiency in the first housing 1 is less likely to drop.

Because the inlet 10 according to the present embodiment includes the first wall 11 and the second wall 12 that overlap one another through the pass space 13, it is possible to secure the introduction of a sufficient amount of air into the first housing 1 while making the presence of the inlet 10 less noticeable in the front face 1c of the first housing 1. That is, as shown in FIG. 6, although a part of the front face 1c of the first housing 1 is opened to form the inlet 10, the first wall 11 is disposed at the back of the opening, so that it is difficult to see the inside of the first housing 1 from the outside. Thus, even if the inlet 10 according to the present embodiment is provided on the front face 1c of the first housing 1 where the user faces to operate the notebook computer, its presence is less noticeable, so that the appearance of the notebook computer can be improved.

Further, since the first gap 14 is situated closer to the top face 1a of the first housing 1 than the second gap 15, it is possible to make the inlet less noticeable in the front face 1c of the first housing 1. That is, when the user operates the notebook computer in a normal position, often, his body opposes the front face 1c and his eyes are situated at a position where the top face 1a and the front face 1c of the first housing 1 can be seen. In other words, the user looks at the first housing 1 somewhat downwardly in a diagonal direction as shown in FIG. 6. If the first gap 14 is situated closer to the bottom face 1b of the first housing 1 than the second gap 15, the first gap 14 comes within the user's sight. Thus, by situating the first gap 14 closer to the top face 1a of the first housing 1 then the second gap 15 as in the present embodiment, the first gap 14 hardly comes within the user's sight.

Further, because the inlet 10, the RAM 23, and the outlet 24 generally are aligned in this order in the present embodiment, it is possible to improve the efficiency of cooling the RAM 23. If the inlet 10 is not provided on the front face 1c of the first housing 1 but on the right side face 1e of the first housing 1 at a portion opposing the outlet 24, it is difficult for air introduced into the housing through the inlet to flow toward the RAM 23, so that the efficiency of cooling the RAM 23 is hard to improve. Note that the electronic component to be aligned with the inlet 10 and the outlet 24 is not limited to the RAM 23 and any other electronic component, such as the CPU, may be so used.

Figure 7:
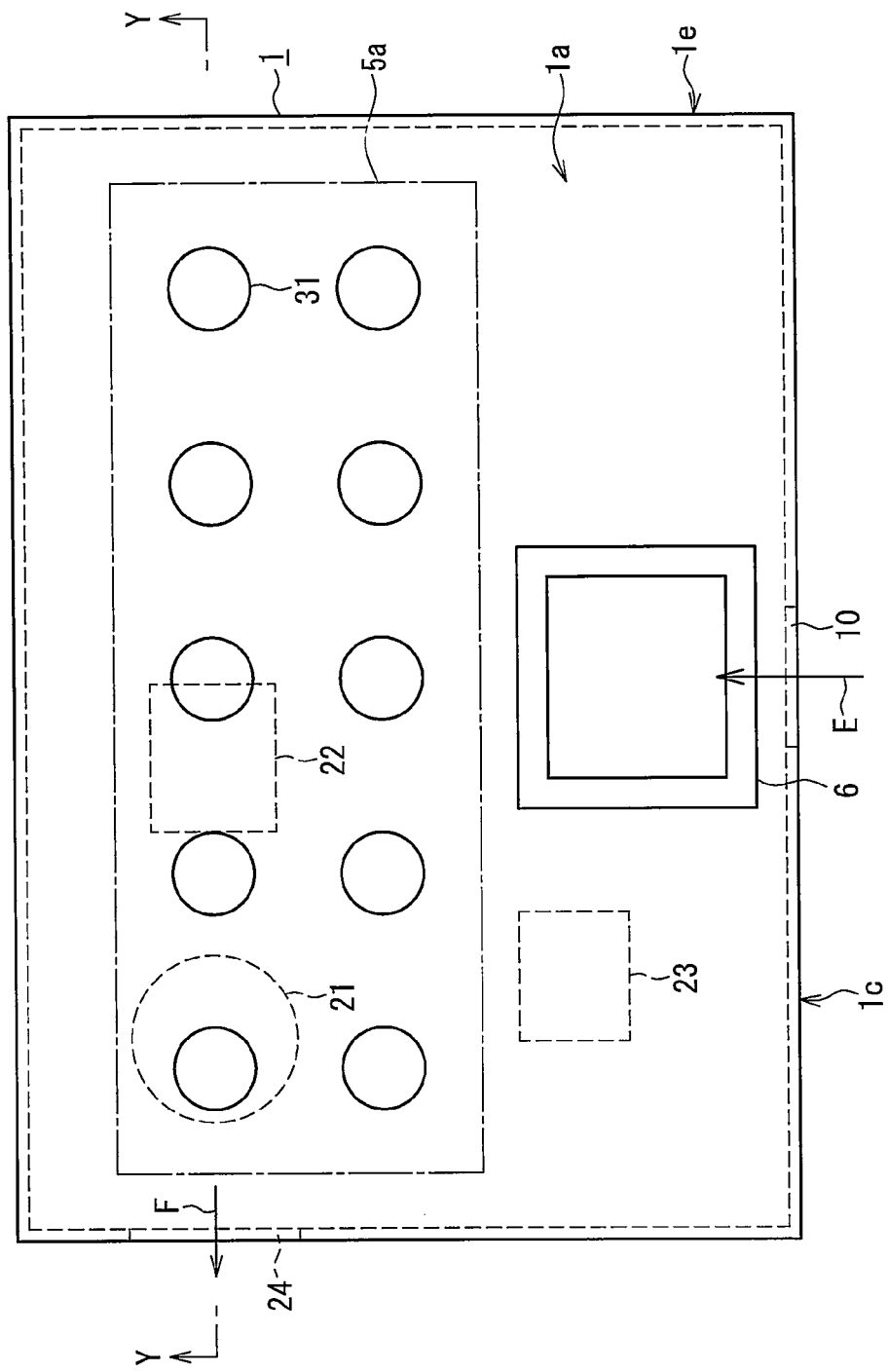
FIG. 7 is a plan view of the first housing with the keyboard being removed.
Figure 8:
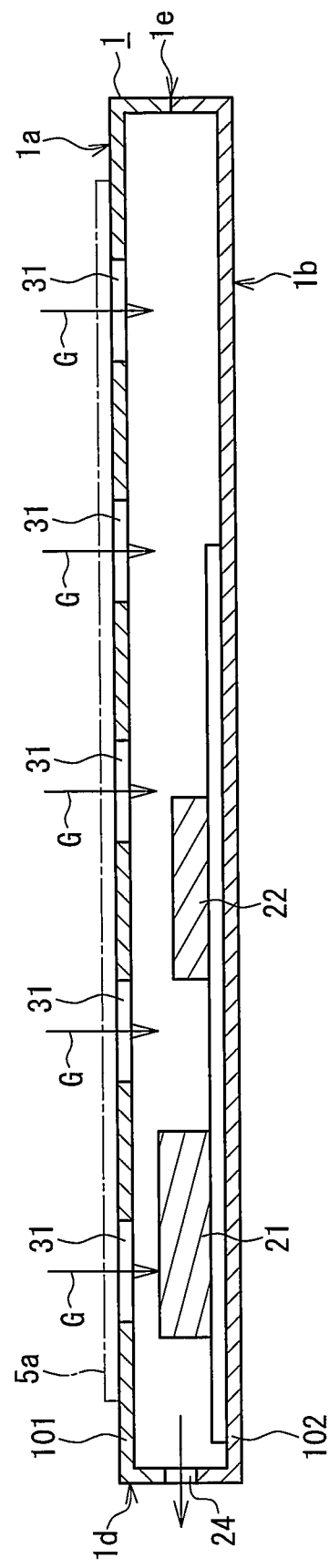
FIG. 8 is a cross-sectional view of a Y-Y portion in FIG. 7.

Although the inlet 10 is provided on the front face 1c of the first housing 1 in the present embodiment, additional inlets may also be provided for the first housing 1. FIG. 7 is a plan view of the first housing 1 with the keyboard 5 being removed. 5a in FIG. 7 denotes the area in which the keyboard 5 was disposed. FIG. 8 is a cross-sectional view of the Y-Y portion in FIG. 7. As shown in FIGS. 7 and 8, the first housing 1 includes a plurality of inlets 31 in the area 5a for disposing the keyboard 5. The inlets 31 are hidden by the keyboard 5 when the keyboard 5 is disposed on the top face 1a of the first housing 1. Even when the inlets 31 are hidden by the keyboard 5, the inlets 31 are in communication with the outside spatially through a slight gap between the top face 1a of the first housing 1 and the keyboard 5. In the notebook computer shown in FIGS. 7 and 8, when the fan 21 is brought in operation, outside air is introduced into the first housing 1 through the inlet 10 as indicated by the arrow E as well as through the plurality of inlets 31 as indicated by the arrows G (see FIG. 8). The air introduced into the first housing 1 through the inlets 10 and 31 takes away heat produced by the CPU 22, the RAM 23, and the like, and is let out through the outlet 24 as indicated by the arrow F. As a result, the RAM 23 can be cooled primarily with the air introduced through the inlet 10 and the CPU 22 can be cooled primarily with the air introduced through the inlets 31.

Figure 9:
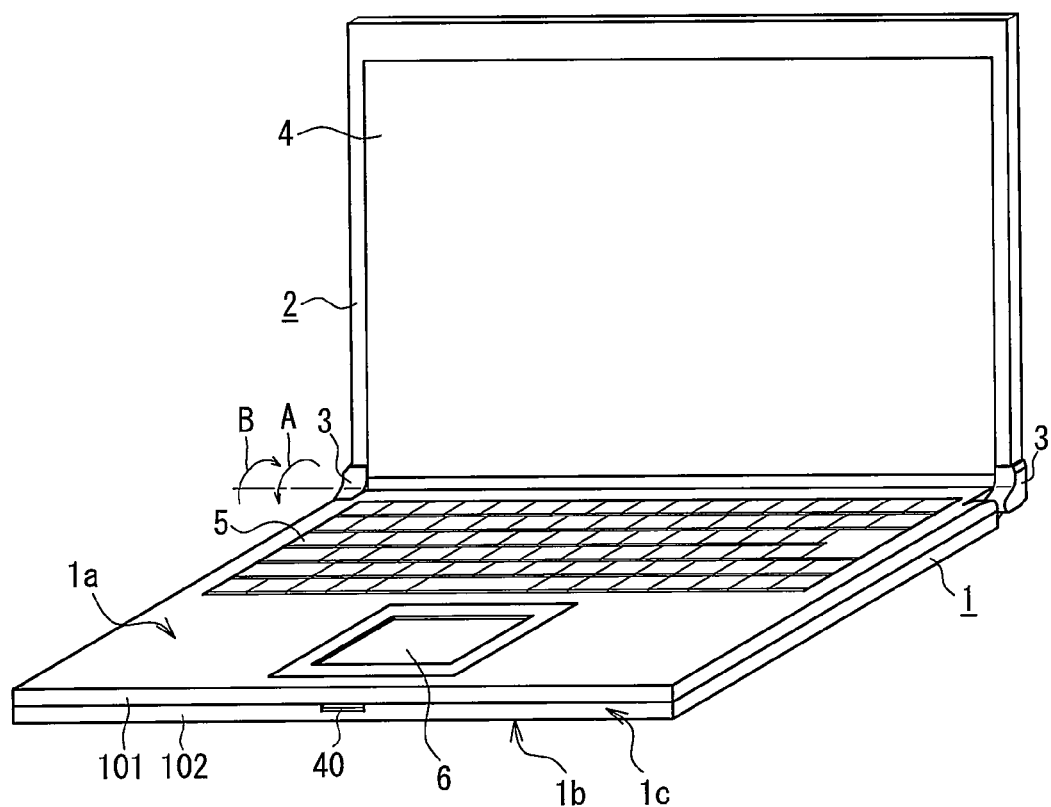
FIG. 9 is a perspective view of a modified example of a notebook computer.
Figure 10:
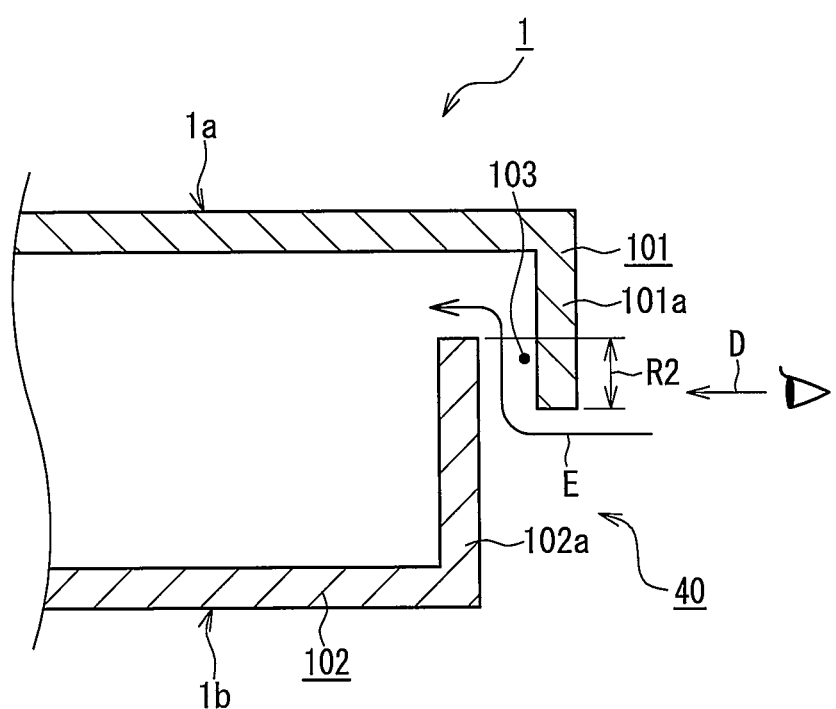
FIG. 10 is a cross-sectional view of principal portions of the first housing.
Figure 11:
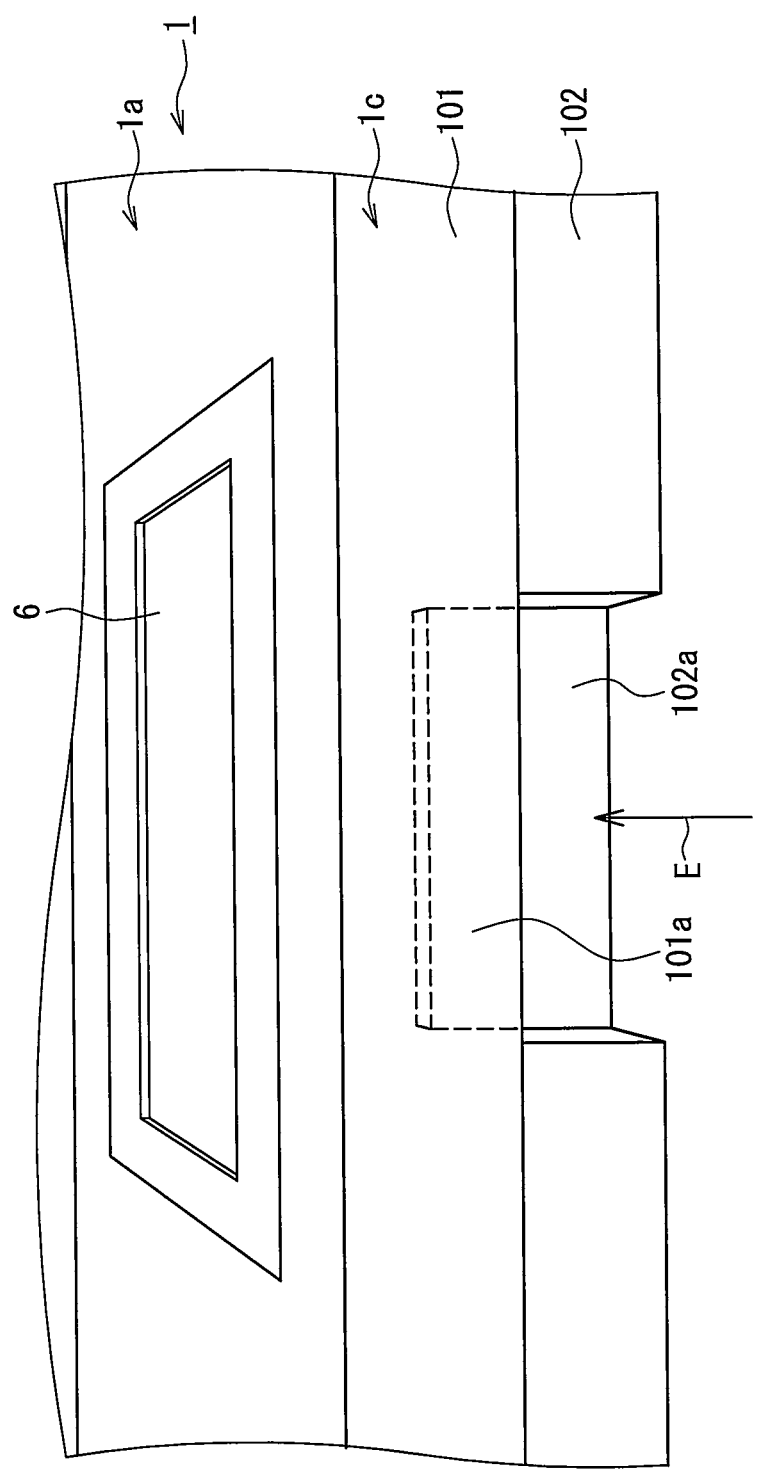
FIG. 11 is a perspective view of the principal portions of the first housing.

FIG. 9 is a perspective view of a notebook computer. FIG. 10 is a cross-sectional view of the periphery of an inlet of the notebook computer shown in FIG. 9. FIG. 11 is a perspective view of the periphery of the inlet of the notebook computer shown in FIG. 9. In FIGS. 9 to 11, the same components as those described with reference to FIGS. 1 to 8 are denoted by the same reference numerals and the detailed description thereof will not be repeated.

As shown in FIG. 10, an inlet 40 is formed by recessing a part of a bottom case 102 toward the inside of the first housing 1 and forming a pass space 103. More specifically, a wall 102a of the bottom case 102 is recessed toward the inside of the first housing 1 from a wall 101a of a top case 101 at a center portion of the front face 1c of the first housing 1, thereby forming a gap (pass space 103) between the walls 101a and 102a. The pass space 103 connects the inside and outside of the first housing 1 spatially. Further, the walls 101a and 102a overlap one another in the thickness direction of the first housing 1. R2 is a dimension by which the walls 101a and 102a overlap one another. R2 as the overlapping amount is not particularly limited as long as it at least is sufficient to hide the inside of the first housing 1 from the user's sight when the user looks at the inlet in the direction of the arrow D, and is preferably 1 mm or more. When the fan 21 (see FIG. 3) operates, outside air passes through the flow space 103 as indicated by the arrow E and flows into the first housing 1 in the inlet 40 shown in FIG. 10.

As shown in FIG. 10, by opening the pass space 103 on the outer side downwardly, the pass of outside air can be bent toward the top face 1a of the first housing 1 as indicated by the arrow E. Thus, even if foreign matters such as dust are contained in outside air, since it is difficult for the foreign matters to pass through the first wall 102 due to their own weight, the foreign matters are less likely to enter the first housing 1.

As shown in FIG. 11, the walls 101a and 102a overlap one another at the inlet 40. Thus, when the first housing 1 is seen in the direction of the arrow D (see FIG. 10), it is difficult to see inside the first housing 1. Consequently, it is possible to make the presence of the inlet 40 less noticeable in the front face 1c of the first housing 1.

Figure 12:
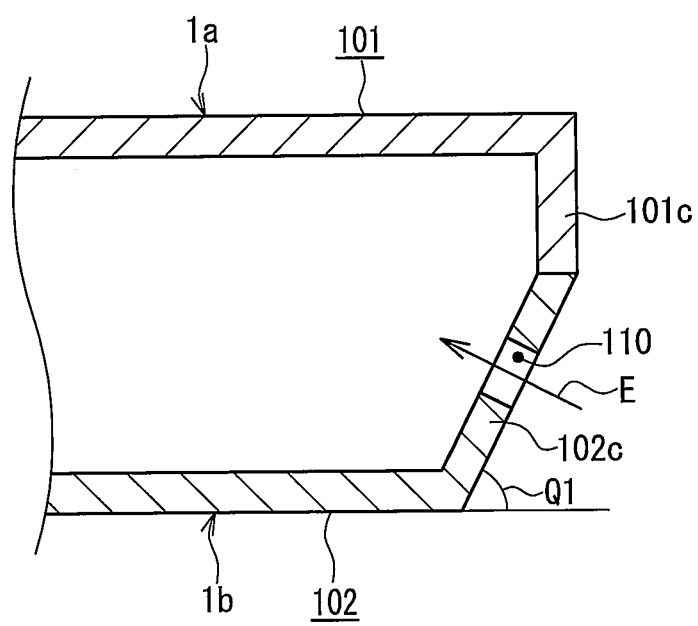
FIG. 12 is a cross-sectional view showing a modified example of an inlet.

Further, an inlet can be provided as shown in FIG. 12. FIG. 12 is a cross-sectional view of the periphery of the inlet of the first housing 1, showing a modified example of the inlet. In FIG. 12, a wall 102c has an acute angle Q1 relative to a line extending from the bottom face 1b of the first housing 1 in the surface direction. The inlet 110 is provided on the wall 102c of the bottom case 102. As shown in FIG. 12, since the wall 102c of the bottom case 102 is inclined and the inlet 110 is provided on the wall 102c, the inlet 110 faces a diagonally downward direction when the notebook computer is placed on a desktop. Because the inlet 110 faces a diagonally downward direction, a sufficient amount of air can be secured and introduced into the first housing 1 while making the presence of the inlet 110 less noticeable in the front face 1c of the first housing 1. Further, as a result of having the configuration as shown in FIG. 12, the pass of outside air can be directed toward the top face 1a as indicated by the arrow E. Thus, even if foreign matters such as dust are contained in outside air, since it is difficult for the foreign matters to move toward the top face 1a due to their own weight, the foreign matters are less likely to enter the first housing 1.

The first housing 1 according to the embodiments is one example of the housing. The inlets 10, 40 according to the embodiments are each one example of the inlet. The outlet 24 according to the embodiments is one example of the outlet. The fan 21 according to the embodiments is one example of the air blower. The CPU 22 and the RAM 23 according to the embodiments are each one example of the heat-producing component. The front face 1c of the first housing 1 according to the embodiments is one example of the "side where a user faces when operating the electronic device".

The present application is useful for an electronic device with a cooling capability.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An electronic device that accepts information input by a user and supplies information to the user, provided with a heat-producing component, comprising a housing for containing the heat-producing component;

an inlet provided to the housing, the inlet permitting communication between an inside and an outside of the housing;

an outlet provided to the housing, the outlet permitting communication between the inside and the outside of the housing; and an air blower for allowing air in the housing to flow toward the outlet, wherein the inlet is provided to a side of the housing to which a user faces when operating the electronic device in a normal operation, the side comprises a first wall that is formed continuously from a bottom face of the housing and does not reach a top face of the housing, and a second wall that is formed continuously from the top face of the housing, the first wall is arranged inwardly on the housing relative to the second wall with a predetermined space interposed therebetween, and an end portion of the first wall and an end portion of the second wall overlap one another in a thickness direction of the housing, the space between the first wall and the second wall defines in part a flow space of the inlet.

2. The electronic device according to claim 1, further comprising a display, wherein the side having the inlet is opposite a side of the housing closest to the display.

3. The electronic device according to claim 2, wherein the display is provided in a casing hingedly mounted to the housing at a side opposite the side having the inlet.

* * * * *